April 26, 1949.                O. H. SCHMITT                2,468,687
                            PULSE STORAGE DEVICE
                            Filed July 9, 1945
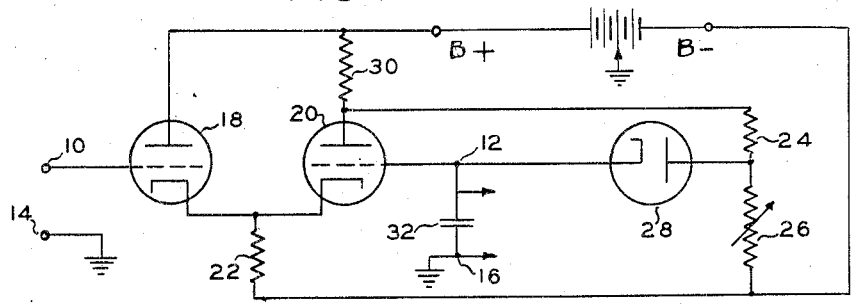
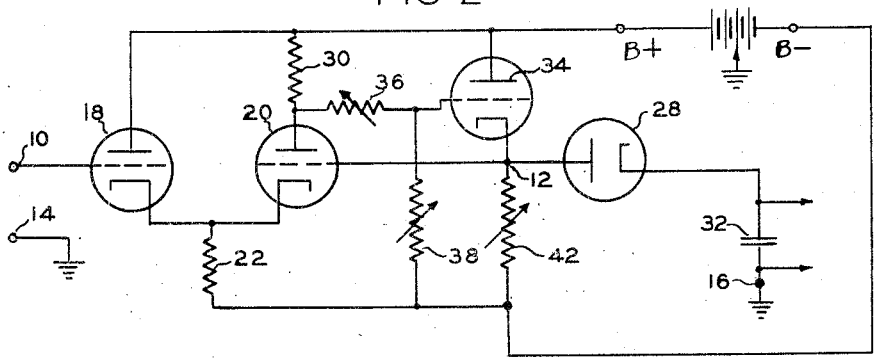
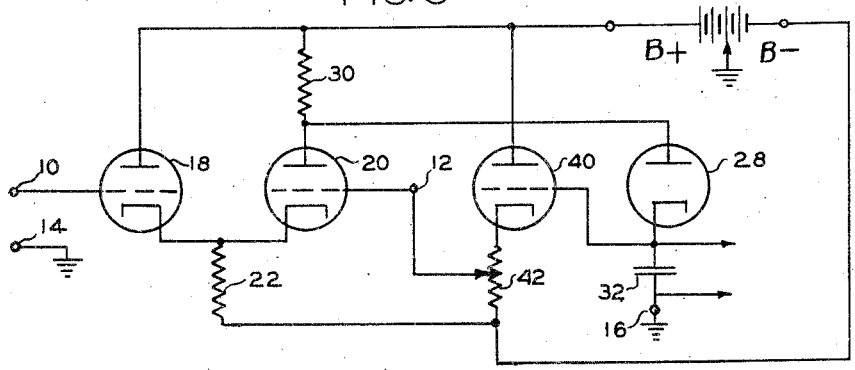
*INVENTOR.*
OTTO H. SCHMITT
BY William D. Hall.
ATTORNEY Patented Apr. 26, 1949

2,468,687

UNITED STATES PATENT OFFICE 2,468,687

PULSE STORAGE DEVICE

Otto H. Schmitt, Port Washington, N. Y., assignor to the United States of America as represented by the Secretary of War Application July 9, 1945, Serial No. 604,064

5 Claims. (Cl. 250—27)

1

This invention relates to data storage means and particularly to apparatus for charging a capacitor to the peak value of a pulsating input voltage.

A primary object of the invention is to provide an apparatus for charging a capacitor to the peak value of an input pulse (or a series of pulses at a high repetition rate) which may be of very brief duration, so that the peak voltage may be measured by instruments ordinarily unable to respond to the pulse.

It is a known expedient in measuring the D.-C. voltage of high-resistance sources to charge a capacitor across the terminals of the source and then measure the voltage to which the capacitor is charged. Where the source is intermittent and especially where its output consists of high-frequency pulsating voltage, resort must be had to some other means. Systems adapted for measuring the peak value of a pulsating voltage are disclosed in copending applications of Donald G. C. Hare, Serial No. 604,059, filed July 9, 1945, now abandoned, and Serial No. 604,058, filed July 9, 1945. The present invention embodies another novel way in which the foregoing is accomplished.

According to this invention, the rectified output of a differential amplifier is arranged to charge a capacitor connected or coupled between one input terminal and ground, while the voltage to be measured is impressed across the other input terminal and ground. The capacitor charges only until its voltage equals or corresponds to the peak of the input pulse or pulses. Rectifier action prevents the capacitor from discharging when the pulse decays. Also, progressive charging during a burst of high-frequency pulses is made possible.

For a better understanding of the invention, reference may be made to the following detailed description and to the drawings, in which:

Figs. 1 to 3 are wiring diagrams of three illustrative species of the invention.

Each of the species embodies some form of rectifier connected in series with a capacitor, which series circuit is supplied with direct current from a high-voltage source until the voltage across the capacitor equals, or bears a known relation with, the peak value of the input voltage, the arrangement being such that a low-resistance charging path is provided for the capacitor irrespective of the source impedance.

The circuit in Fig. 1 best illustrates the fundamentals of the invention. The cathode phase inverter amplifier, or differential amplifier, as here shown, comprises tubes 18 and 20. There

2 are two pairs of input terminals; 10 and 14, and 12 and 16, terminals 14 and 16 being grounded. The grid of tube 18 is connected to terminal 10 while the grid of tube 20 is connected to terminal 12. The cathodes of tubes 18 and 20 have a common bias resistor 22 connected to B—, while the plate of tube 20 has a load resistor 30, both plates being connected to B+. Normally it is unnecessary to supply tube 18 with the usual plate load resistor, except as a balancing expedient to render the system immune to supply-voltage variations. Ground is connected to a tap in the B supply. For a more detailed explanation of this form of amplifier, reference is made to the paper on "Cathode Phase Inversion," by Otto H. Schmitt in the Review of Scientific Instruments, vol. 12, pages 548–551, November 1941.

Measuring capacitor 32 is connected between the terminals 12 and 16. Terminal 12 is connected through a series path comprising a rectifier 28 and resistors 24 and 30 to the B supply. Variable resistor 26 is provided between the high-potential side of rectifier 28 and B— to fix the grid of tube 20 at ground potential when input terminals 10 and 14 are short-circuited.

In operation, if positive voltage is suddenly impressed on terminal 10 relative to ground, the resulting rise in current through tube 18 raises the current through cathode resistor 22 and consequently increases the bias on tube 20. The resulting decrease in plate current through tube 20 raises the voltage on its plate and consequently on the plate of rectifier 28, which causes charging of capacitor 32. The voltage across the capacitor, effectively applied to the grid of tube 20, reaches a limit which is proportional and nearly equal to the input voltage at terminals 10 and 14.

The resistance of rectifier 28 and of resistors 24 and 30 is very small compared with the possible impedance of the voltage source at terminals 10 and 14. For this reason, a large capacitor can charge rapidly, deriving its energy from the B supply, whereas a high-impedance source direct-connected would restrict its charging rate. For pulses of short duration, the foregoing arrangement enables a full charge to be attained where this would be impossible with the capacitor and rectifier directly applied to the high-impedance source.

During decay of an input pulse, rectifier 28 prevents discharge of the capacitor through resistor 26, and the grid of tube 20 is at all times negative with respect to cathode. During a brief burst of equal positive pulses at a high repetition rate, the capacitor will progressively build up its charge to nearly the peak value of the pulses.

The charged capacitor may then be used with a vacuum-tube voltmeter or like instrument to measure the pulse peak. Such instruments are not ordinarily responsive to brief input pulses. The charge retained by the capacitor will in time leak off through the measuring instrument, or a switch or a high-resistance shunt may be provided for this purpose.

This arrangement may be refined and carried forward using a current amplifier such as the cathode follower tube 34 in Fig. 2. Variable voltage-divider resistors 36 and 38 and cathode resistor 42 are adjusted to set the grid of tube 20 and cathode of tube 34 at ground potential when there is no input at terminals 10 and 14. Rectifier 28 and measuring capacitor 32 are connected in series from terminal 12 to terminal 16 and ground. The cathode of tube 34 and grid of tube 20 are connected to terminal 12.

In this cathode-follower arrangement, the capacitor is charged from the B supply at a rate determined by the transconductance of tube 34, in addition to the gain of the differential amplifier. It is apparent that further gain may be attained with additional direct-current amplifier stages.

Another variant of the circuit in Fig. 2 (not shown) is to omit rectifier 28 and resistor 42, connecting the capacitor directly to terminal 12. Tube 34 then operates in part as a rectifier under the circumstances.

As stated earlier, the essentials of this system for measuring pulse peaks are a differential amplifier and a series combination including some form of rectifier and a measuring capacitor with feedback from the capacitor into the amplifier. Each of the above arrangements has the capacitor and rectifier (or the capacitor alone) connected to one of the input grids of the differential amplifier. The above arrangements also include a voltage divider composed of resistors 30, 24, and 26 or 30, 36, and 38, and they charge the capacitor to a predetermined value in relation with the peak value of the voltage input. The modification in Fig. 3 serves to demonstrate that these factors are not essentials of the broad concept.

In Fig. 3, tube 40 passes current through potentiometer 42, the movable tap of which is connected to terminal 12 at the grid of tube 20. This grid is not connected to the capacitor, as contrasted with the arrangements described hereinabove. The plate of tube 20 is connected in series through rectifier 28 and capacitor 32 to any desirable tap in the B supply, which may be ground. By adjusting the connection of the grid of tube 20 along the potentiometer 42, the ratio of the peak input voltage to the voltage across the capacitor 32 may be varied.

While there have been described several preferred embodiments of the invention, it will be obvious to those skilled in the art that many modifications may be made therein without departing from the spirit of the invention.

What is claimed is:

1. A storage system for measuring the crest voltage of pulses having a predetermined polarity, comprising at least first and second electron tube means, each having at least cathode, anode and grid electrodes, said cathode electrodes being coupled to a common cathode impedance, means to impress the voltage to be measured on the grid of said first electron tube means, a measuring capacitor and a rectifier connected together in series combination, means electrically interconnecting said measuring capacitor with the grid electrode of said second electron tube means so that the capacitor will impress its charge voltage upon the said grid electrode, means electrically interconnecting said series combination with the anode of said second electron tube means so that changes in said anode voltage caused by the voltage impressed upon the grid of the first electron tube means will be rectified, impressed upon and retained by the measuring capacitor.

2. A storage system for measuring the crest voltage of pulses having a predetermined polarity, comprising at least first and second electron tube means, each having at least cathode, anode and grid electrodes, said cathode electrodes being coupled to a common cathode impedance, means to impress the voltage to be measured on the grid of said first electron tube means, a measuring capacitor and a rectifier connected together in series combination, and network means coupling said series combination to the grid and anode electrodes of said second electron tube means so that the charge voltage impressed upon the measuring capacitor will also be impressed upon the grid of the second electron tube means and voltage changes on the anode of the second electron tube means caused by the voltage impressed upon the grid anode of the first electron tube means will be rectified, impressed upon and retained by said measuring capacitor.

3. The system recited in claim 2 wherein said network means includes a cathode follower electron tube having a grid electrode, said grid electrode being electrically coupled to the anode of the second electron tube means, said series combination being coupled to said cathode follower electron tube means and also to the grid electrode of said second electron tube means.

4. The system set forth in claim 2 wherein said network includes a third electron tube means with at least grid, cathode and anode electrodes, an impedance in the cathode circuit of said third electron tube, variable means connected to the grid electrode of the second electron tube means for selecting a portion of the voltage across said impedance, said series combination being coupled to the anode electrode of the second electron tube means.

5. The structure recited in claim 2 wherein said common cathode impedance means is a resistance.

OTTO H. SCHMITT.

REFERENCES CITED

The following references are of record in the file of this patent:

FOREIGN PATENTS

| Number | Country | Date |
| --- | --- | --- |
| 626,598 | Germany | Feb. 28, 1936 |
| 629,327 | Germany | Apr. 30, 1936 |